May 21, 1968  D. G. FAWKES  3,384,340
BUTTERFLY VALVE FOR HIGH VACUUM SERVICE
Filed June 25, 1965  2 Sheets-Sheet 2
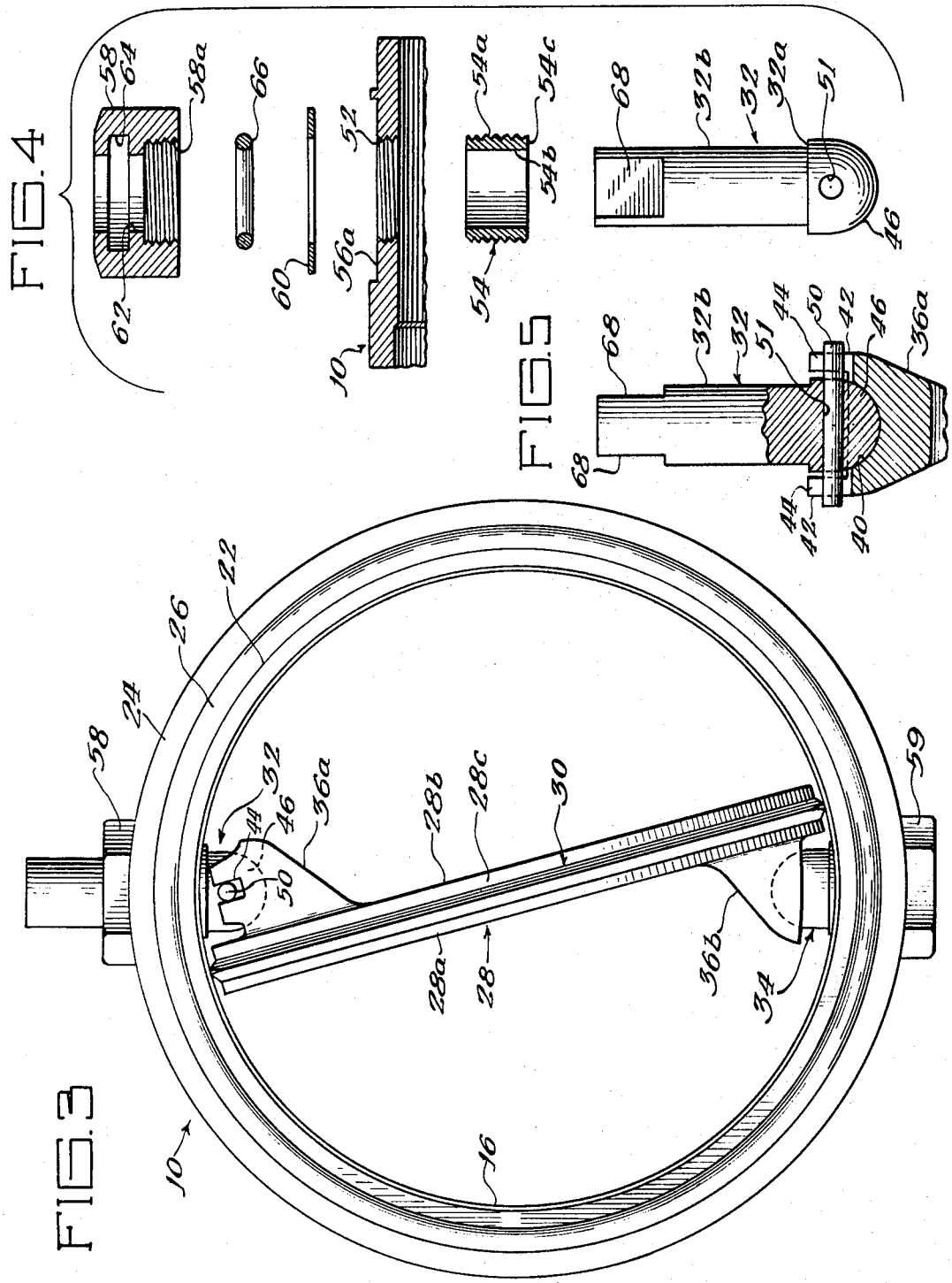

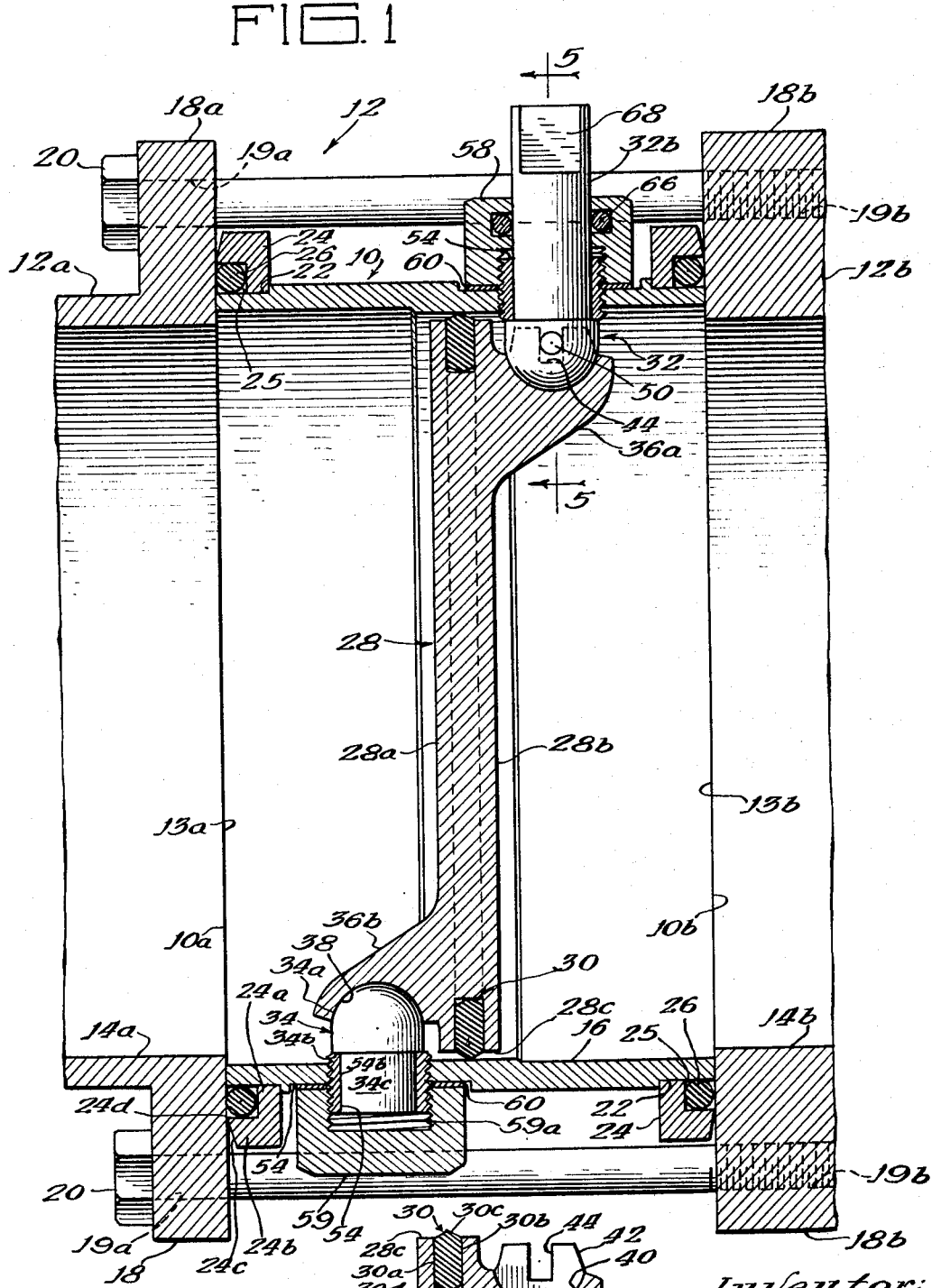

United States Patent Office 3,384,340
Patented May 21, 1968

3,384,340
BUTTERFLY VALVE FOR HIGH VACUUM SERVICE
Donald G. Fawkes, Chicago, Ill., assignor to Henry Pratt Company, a corporation of Illinois
Filed June 25, 1965, Ser. No. 466,930
12 Claims. (Cl. 251—307)

ABSTRACT OF THE DISCLOSURE

A butterfly valve for vacuum service characterized in that the valve disc carries a sealing ring in the periphery thereof and is mounted by a means of a universal joint to laterally offset parallel mounting shafts. The valve body has resilient sealing rings in axially outwardly facing cavities for sealing the connection of the body into a pipeline. The universal mounting of the valve disc is afforded by stub shafts received in sockets in the disc. A sleeve bearing is telescoped over a stub shaft, abutting a shoulder on the stub shaft. The sleeve bearing is threaded in an opening in the valve body and a cap is threaded over the sleeve, the interior of the cap carrying a seal which seals against leakage along the stub shaft. A gasket is interposed between the bottom of the cap and the area about the threaded opening in the valve body to seal against leakage.

--- to a new and improved butterfly valve for vacuum service.

There has been a growing need for butterfly valves which can be used in high-vacuum applications. This is particularly true in the field of research wherein the effect of a vacuum condition, such as might be found in outer space or other planets is being studied. In such applications, the function of the valve is not to seal in the pipeline at a great pressure differential as might be found in typical applications in liquid conduits, but at only approximately 14.7 pounds per square inch, the pressure of atmospheric air. A problem which has arisen is that the outside atmospheric air may leak to the interior of the vacuum line through the several valve fittings and thereby eliminate the vacuum condition.

In ordinary valve construction, the fittings are typically welded together and are connected by means of welding to the valve body. In an ordinary steel weld, the porosity of the weld permits leakage of air from the atmosphere to the interior of the valve body wherein vacuum or near vacuum conditions exist. Moreover, the seal between the butterfly valve body and the sections of the pipe to which the body is joined, while being sufficient to maintain high fluid pressures within the pipe line, may not be sufficient to prevent atmospheric air from leaking to the interior of a vacuum pipe line. Thus it is a general object of this invention to provide a new and improved butterfly valve.

A primary object of this invention is to provide a new and improved butterfly valve especially suited for vacuum service.

A more detailed object of this invention is to provide a new and improved butterfly valve suited for vacuum service wherein the connections of the several components of the valve as well as the connection of the valve to the pipe line is such as to prevent the leakage of atmospheric air from the outside of the valve and pipe line to the interior thereof when vacuum conditions exist within the interior of the valve and pipe line.

Another object of this invention is to provide a new and improved butterfly valve wherein the valve shaft sleeves or bushings are secured to the valve body by means other than welding.

Another object of this invention is to provide a new and improved butterfly valve having a novel seal structure at the juncture between the butterfly valve body and the pipe line including a metallically compressed O-ring.

Yet another object of this invention is to provide a butterfly valve having a valve disc with a novel sealing ring mounted in the periphery thereof, which ring provides a seal against a smooth valve housing to prevent passage of molecules of air when the valve is closed.

A further object of this invention is to provide, in a butterfly valve, a novel means for sealing the penetration of the butterfly valve shaft through the valve body.

Yet another object of this invention is to provide, in a butterfly valve, means for sealing the penetration of the valve shaft through the valve body which includes means for adjusting the valve disc connection to the valve shaft to obtain an optimum seating of the valve disc in the valve body in the sealing position.

Other objects, features and advantages of the present invention will be apparent from the following description of the preferred embodiments illustrated in the accompanying drawings, in which:

FIGURE 1 is a longitudinal section view of a pipe line showing a butterfly valve embodying the features of this invention, the valve disc being shown in a fully closed position;

FIGURE 2 is a fragmentary sectional view of a portion of the valve disc;

FIGURE 3 is an end elevational view of the butterfly valve body shown in FIGURE 1 with the valve disc shown in the open position;

FIGURE 4 is an exploded view of the components of the upper shaft assembly which is connected to the valve disc at the portion shown in FIGURE 2; and FIGURE 5 is a fragmentary view partially broken away in section, taken along the line 5—5 of FIGURE 1 showing the connection of the turning shaft to the valve disc at the portion shown in FIGURE 2.

Butterfly valve body 10 of this invention preferably is a generally circular cylindrical body of a high density material, impervious to the infiltration of atmospheric air under conditions of sub-atmospheric pressure within the body, such as an aluminum alloy. The valve body is shown here with planar parallel ends 10a and 10b for mounting the valve body in a pipe line 12. Pipes 12a and 12b which make up the pipe line 12 are similarly provided with mating planar ends 13a and 13b, respectively. The pipes 12a and 12b have hollow, preferably circular cylindrical, interiors 14a and 14b, respectively, forming a passage therethrough and the valve body has a similar hollow passage 16, also preferably circular cylindrical in configuration, which forms a continuous passage with the passages of the two pipes.

Each pipe 12a and 12b is provided with flanges 18a and 18b, respectively, having openings 19a and 19b, respectively, for receiving a fastening means, such as a bolt 20 for securing the pipe line and valve body as a unit. One of the openings, such as the opening 19b, may be tapped to receive the threaded end of the bolt 20.

The outer periphery of the valve body is provided with a groove 22 adjacent each end 10a and 10b for receiving a retaining ring 24. The retaining ring is flanged so as to be generally L-shaped in cross section, having a ring-like portion 24a which is substantially rectangular in cross section and a flange portion 24b spaced from the valve body and projecting outwardly toward the ends 10a and 10b thereby forming the leg of the L. The flange portion 24b has a front face 24c which is inclined slightly outwardly relatively to the leg portion 24a and which terminates in a wide-angle point 24d. The L-shape of the retaining ring forms a seal-retaining cavity 25 of fixed dimension between the retaining ring and exterior of the valve body. An O-ring 26 is positioned in this cavity, bounded in two quadrants by the portions 24a and 24b of the retaining ring, and in another quadrant by the outer periphery of the valve body (particularly the groove portion 22). In a fourth quadrant, the O-ring 26 abuts the pipes 12a and 12b in the portion of the flanges 18a and 18b, respectively. Thus when the valve body is positioned in the pipe line and drawn up against the adjacent portions of the pipe line during the tightening of the bolt 20, the resilient O-ring will be forced against the valve body, the retaining ring and the pipe line to seal the juncture of the valve body and pipe line against leakage.

The abutment of the projection 24d against the pipe line flange and of the disc portion 24a against the side of the groove 22 holds the retaining ring against lateral movement relative to the valve body and in a position wherein the O-ring 26 is maintained in abutment with the retaining ring, the pipe line and the valve body as a result of the lateral confinement of the retaining ring and the dimension of the cavity 25. As previously mentioned, welds may be vulnerable to leaking atmospheric air through the weld which would be highly undesirable in a situation wherein the butterfly valve body was being installed for use in a pipe line which would be subjected to sub-atmospheric pressures or complete vacuum. This invention provides a very efficient air-tight seal at this juncture of the valve body and pipe line thereby making the butterfly valve body most suitable for use in vacuum applications.

The valve disc 28 is a generally circular disc having two opposed flat faces 28a and 28b and an outer periphery 28c. In the valve of this invention, the valve disc resilient sealing member or ring 30 is mounted in the periphery 28c of the valve disc. The resilient sealing ring 30 is preferably generally washer-like in configuration having two flat, generally parallel, faces 30a and 30b and a generally wide-angle, V-shaped, outwardly projecting, inner and outer periphery 30c and 30d, respectively. While other resilient sealing configurations may be satisfactory for use in vacuum service, it has been found that the aforementioned sealing ring performs most efficiently under vacuum conditions.

Preferably, the outer diameter of the disc 28, including the resilient sealing ring 30, is slightly larger than the inner diameter of the fluid passage 16 so that slight deformation of the ring 30 will occur wherever it contacts the interior surface of the fluid passage.

The valve disc is mounted for rotation on stub shafts 32 and 34 which project radially inwardly through the wall of the valve body on parallel, but laterally offset, center lines. These shafts are secured to the valve disc at enlarged facial portions 36a and 36b, respectively, formed on diametrically opposite peripheral portions of the opposite faces of the valve disc.

The stub shafts 32 and 34 are mounted to the valve disc in such a manner as to effect a universal joint with the disc. To this end, the valve shaft 34 is provided with a hemispherical end 34a which is received in a ball socket 38 in the projection 36b. The upper surface of projection 36a has a spherical socket 40 and two upstanding fingers 42 forming a notch 44 therebetween. The hemispherical end 46 of the stub shaft 32 is provided with a pin 50 which projects outwardly from opposite sides thereof. The stub shaft is positioned in the spherical socket with the pin lying between the fingers 42 so that when the shaft 32 is turned, the pin will abut the opposed fingers to transmit the turning force to the valve disc. The bifurcation of the opposed fingers, the notch 44 therebetween, and the spherical socket 40 allows for relative movement of the shaft 32 and the valve disc in any other plane. Thus the valve disc 28 is effectively mounted on the shafts by means of a universal joint connection so that the disc may be swung through a spherical path to the fully open position as shown in FIGURE 3 wherein the disc is in a plane which is canted relative to the plane of the shafts 32 and 34. In swinging between the open and closed position with such a mounting, the contact of the seal 30 and the inner wall 16 of the valve body is kept to a minimum. Only at the last moment when the disc is swung to the closed position is there any peripheral engagement of the seal 30 and the inner wall 16 which amounts to more than a mere two point engagement as shown in FIGURE 3. When the valve disc is in the open position, the outer periphery, including ring 30, describes a sphere slightly larger than the inner periphery of the fluid passage 16. The spherical mounting of the disc aids in the sealing engagement between the "sphere" and the smooth bore of the fluid passage when the disc is swung to the closed position.

Preferably the inner surface of the passage 16 is honed to a fine finish, at least in the area of engagement with valve disc. This may be done by grinding, honing or hand lapping. For ease of production, the valve bodies may be cut from continuous lengths of pipe which have had the entire length of the interior passage finished smooth, in which case there would be no raised seat as shown in the drawings. It has been found that a finish of 16 R.M.S. gives optimum sealing conditions. An extremely smooth finish is desirable in valves to be used for vaccum service so that an absolute tight seal may be formed with the valve disc sealing ring; for in vacuum applications, the valve must seal against leakage of molecules of gas.

The stub shafts 32 and 34 are mounted in the wall of the valve body in a novel manner which eliminates the need for welding, provides a sufficient seal against a possible leakage of atmospheric air from the outside of the valve body to the inside of the valve body and which affords a means for adjusting the seating of the valve disc within the valve body. To this end, the valve body is provided with threaded openings 52 formed on parallel center lines but laterally offset relative to each other on diametrically opposite surfaces of the valve body. A supporting bearing sleeve 54 having an external thread 54a and an interior rotary bearing surface 54b of a size for closely embracing the shanks 32b and 34c of the stub shafts 32 and 34, respectively, is threaded through the openings 52 in the valve body. The ends of the bearings 54c are machined to provide a thrust bearing which abuts the shoulders 32a and 34b formed at the juncture of the shanks and ball-like ends of the shafts 32 and 34, respectively.

The outer periphery of the valve body is provided with flat portions 56 formed about the threaded openings 52. Cap nut 58 having an interior thread 58a is threaded to exterior 54a of the bearing sleeve which embraces stub shaft 32. A similar nut 59 is provided for the bearing sleeve which embraces the stub shaft 34, this nut having an interior thread surface 59a. In both cases, a static sealing member, such as the disc-like gasket 60, is positioned between the bottom of the nut cap and flat surface 56 on the exterior of the valve body (thereby producing a static seal). As the nut caps are threaded about the bearing sleeves to compress the gaskets 60, a static seal is created to seal against leakage about the threads of the bearing sleeve, valve body opening, and nut cap.

The stub shaft 32 is longer than the shaft 34 so that it may be actuated from the exterior of the valve body for rotating the valve disc. To accommodate this extension, the nut cap 58 is provided with a sleeve-like opening 62 of a size to generally embrace the shank 32a of the stub shaft 32. The nut cap 58 is further provided with a circumferential groove 64 in the sleeve 62 for receiving an O-ring 66. The O-ring 66 is firmly captivated in three sides of the circumferential groove 64 and in a fourth quadrant bears against the periphery of the stub shaft shank to provide a seal between the cap and the shank of the stub shaft such as to prevent leakage along the outer walls of the stub shaft.

At its outer end, the stub shaft 32 may be provided with means, such as wrench flat 68, for receiving an operating tool for turning the shaft to move the valve disc between the fully closed and fully open position.

It is to be noted that the axial extent to which the bearing sleeve 54 may be threaded through the opening 52 in the valve housing is not limited. The sleeve need only be threaded through the valve body opening a distance to permit sufficient portions of the threaded exterior thereof to project through the thickness of the valve housing and the gasket 60 to provide an adequate threaded exterior for threaded engagement with the nut cap. The shoulders 32a and 34a on the stub shafts 32 and 34, respectively, in abutment with the surfaces 54c on the bearing sleeves, fix the interior projection of the ball-like mounting ends of the stub shafts depending upon the extent to which the bearing sleeve 54 is threaded through the housing openings 52. It is to be remembered that the threading of the nut cap about the bearing sleeve will sufficiently lock the bearing sleeve in any desired position of threaded extent through the housing opening 52. By trial and error, the bearing 54 may be threaded through the housing opening 52 to an optimum point for each individual valve body which provides the best seating of the valve disc in that valve body. Thus the stub shaft mounting arrangement of this invention provides not only a means for sealing the projection of the shafts through the valve body openings against leakage of atmospheric air to the interior of the valve body, but further provides a means for adjusting the position of the valve disc to obtain the optimum seating of the disc within the valve body.

The valve of this invention is ideally suited for use with pipe lines which are subjected to vacuum conditions. The juncture of the valve body and pipe line is sealed by means of an O-ring to positively prevent leakage of atmospheric air to the interior of the pipe line, thereby eliminating a possible point of leakage. Furthermore, the shafts to which the valve disc is mounted are secured to the valve body through the use of threaded bearing sleeves and cap nuts utilizing static and dynamic seals which prevent the leakage of air through this juncture thereby eliminating the need for welding the mounting of the shafts to the valve body as was the former practice. In addition, the mounting of the shafts to the valve body is accomplished in such a manner as to provide a means for adjusting the seating of the valve disc in the valve body at the time of assembly.

The foregoing detailed description has been given for clearness of understanding only, and no unnecessary limitations should be understood therefrom, as some modifications may be obvious to those skilled in the art.

I claim:

1. A butterfly valve for use in high level vacuum service, comprising: a valve body having a passage therethrough; a valve disc within the valve body for controlling flow through the passage; means in the valve body for mounting the valve disc including a pair of offset parallel mounting shafts extending through the housing and connected to opposite sides of the disc at diametrically spaced points with a universal joint connection to mount the valve disc for movement between a fully closed position wherein the periphery of the valve disc is in sealing engagement with the passage in the valve body and the disc is substantially perpendicular to the axis of the passage, and movement away from the closed position, wherein the valve disc is skewed to the axis of the passage and the mounting shafts.

2. The butterfly valve of claim 1 wherein said valve disc is provided with a resilient sealing ring in the periphery thereof, said sealing ring being maintained free of contact with the passage in the valve body throughout its major periphery in all open positions of the valve disc in the body as a result of the path of travel of the periphery of the valve disc.

3. A butterfly valve for use in high-level vacuum service, comprising: a valve body of high-density material impervious to infiltration of atmospheric air under conditions of sub-atmospheric pressure within the body, said body having end portions and a through passage between the end portions; a seal retaining ring mounted about each end portion of the body forming a seal retaining space in co-operation with the body; a resilient seal in each such space in position to seal the valve to adjoining means containing vacuum passages; an imperforate valve disc within the valve body passage carrying a sealing member peripherally in position to seal such passage when the disc is in closed valve position; and a pair of stub shafts, one on either side of the disc, supporting and mounting the disc in the valve body, each stub shaft having a supporting bearing sleeve threaded into and through the valve body and a cap exterior of the housing surrounding said bearing sleeve and sealingly engaging the exterior of said housing, one of said stub shafts extending through said cap with sealing means between the cap and stub shaft.

4. The butterfly valve of claim 3 wherein said valve body is circular cylindrical in cross section and said stub shafts extend radially inwardly from said housing.

5. The butterfly valve of claim 3 wherein said stub shafts are mounted in said valve body on parallel center lines and wherein said stub shafts are connected with said valve discs through a universal joint.

6. The butterfly valve of claim 3 wherein the exterior of the valve body has flat portions about the bearing sleeves and a static seal gasket is positioned on said flat portions of the valve body in a position to be compressed by said cap; and wherein an O-ring is positioned between the periphery of the stub shaft and the interior of said one of the threaded caps to seal the mounting of the stub shafts in the valve body against fluid leakage.

7. The butterfly valve of claim 3 wherein the valve body is provided with threaded openings into which the bearing sleeves are threaded with the caps threaded on the bearing sleeves to provide a means for adjusting the position of the disc relative to the valve body passage; and wherein said bearing sleeves have means providing a rotary and thrust bearing surface for said stub shafts.

8. The butterfly valve of claim 3 wherein the valve body is circular cylindrical in cross section and is provided with stop means adjacent the end thereof and the retaining rings are telescoped over the periphery of the end portions of the body and positioned against the stop means with the resilient seal telescoped over the valve body in the space between the valve body periphery and the retaining ring so that as the valve body is drawn against adjacent portions of a pipe line in which the body is assembled, the resilient seal will be forced against the valve body, the retaining ring and the pipe line to seal the juncture against leakage.

9. The butterfly valve of claim 3 wherein the sealing member is generally washer-like in configuration, having two substantially flat, generally parallel faces, and a generally wide-angle, V-shaped, outwardly projecting, inner and outer periphery.

10. A butterfly valve for use in high level vacuum service, comprising: a valve body having a passage therethrough; an imperforate valve disc having a peripheral groove extending radially outwardly about the edge of the disc, said groove having generally parallel spaced side walls and a generally circular cylindrical bottom wall; a resilient annular seal ring mounted in said peripheral groove, said ring having generally flat radially arranged spaced side walls respectively facing and generally abutting the side walls of said groove and generally wide-angle, V-shaped inner and outer surfaces respectively engaging said groove bottom wall and said valve body passage; and a pair of stub shafts, one on each side of the disc universally connected to the disc, extending through the valve body for supporting the disc within the valve body.

11. A butterfly valve for use in high level vacuum service, comprising:
   a valve body having a passage therethrough;
   a valve disc within the valve body for controlling flow through the passage;
   means in the valve body for mounting the valve disc including a pair of mounting shafts; and
   a sleeve bearing over each mounting shaft, one of the sleeve and mounting shafts having a shoulder against which the other abuts, at least one sleeve being connected to the valve body for movement toward and away from the longitudinal axis of the valve body to move at least one of the mounting shafts inwardly and outwardly relative to the axis of the valve body, and lock means connected to the sleeve for locking the sleeve and mounting shaft in a selected position.

12. The butterfly valve of claim 11 wherein said one sleeve is threaded in a threaded opening in the valve body with the shoulder being formed on the mounting shaft and wherein the locking means comprises a cap having a threaded interior which is threaded about the exterior of the sleeve with sealing means interposed between the interior of the cap and the mounting shaft and between the exterior of the cap and the valve body adjacent to the threaded opening in the valve body.

References Cited

UNITED STATES PATENTS

| | | | |
|---|---|---|---|
| 1,629,627 | 5/1927 | Kaiser | 251—86 |
| 2,058,996 | 10/1936 | Kollberg | 251—306 |
| 2,886,062 | 5/1959 | Wheatley | 251—306 |
| 3,126,193 | 3/1964 | Atherton | 251—306 |

FOREIGN PATENTS

| | | |
|---|---|---|
| 1,154,823 | 11/1957 | France. |
| 1,255,873 | 1/1961 | France. |
| 518,285 | 2/1940 | Great Britain. |

M. CARY NELSON, *Primary Examiner.*

W. CLINE, *Assistant Examiner.*